United States Patent
Ayloo

(10) Patent No.: US 7,974,940 B2
(45) Date of Patent: Jul. 5, 2011

(54) REAL TIME EXPERT DIALOG SERVICE

(75) Inventor: Kalyan Ayloo, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 405 days.

(21) Appl. No.: 12/125,691

(22) Filed: May 22, 2008

(65) Prior Publication Data

US 2009/0292722 A1    Nov. 26, 2009

(51) Int. Cl.
*G06F 7/00*   (2006.01)
*G06F 17/30*   (2006.01)

(52) U.S. Cl. ........................................................ 707/608

(58) Field of Classification Search ................. None
See application file for complete search history.

(56) References Cited

U.S. PATENT DOCUMENTS

| | | | | |
|---|---|---|---|---|
| 4,677,657 | A | * | 6/1987 | Nagata et al. ................. 455/558 |
| 6,064,978 | A | * | 5/2000 | Gardner et al. ................. 705/10 |
| 7,120,668 | B2 | | 10/2006 | Manber et al. |
| 7,676,034 | B1 | * | 3/2010 | Wu et al. ................. 379/265.01 |

* cited by examiner

*Primary Examiner* — Pierre M Vital
*Assistant Examiner* — Jason Liao
(74) *Attorney, Agent, or Firm* — Hickman Palermo Truong & Becker LLP

(57) ABSTRACT

Methods and systems provide for establishment of online dialogs between a person and a user of an online community where those people are not necessarily familiar with each others areas of expertise or interests. The methods and systems can categorize a dialog topic received from the person, and determine, from categorization of users, a selection of users of a system to receive the dialog topic. That selection can be further narrowed according to user availability and/or ranking determinations, as well as an initial subject matter test posed to the selection of users. Judging the acceptability of the users' responses can help determine subject matter expertise in an area relevant to the proposed topic.

30 Claims, 5 Drawing Sheets

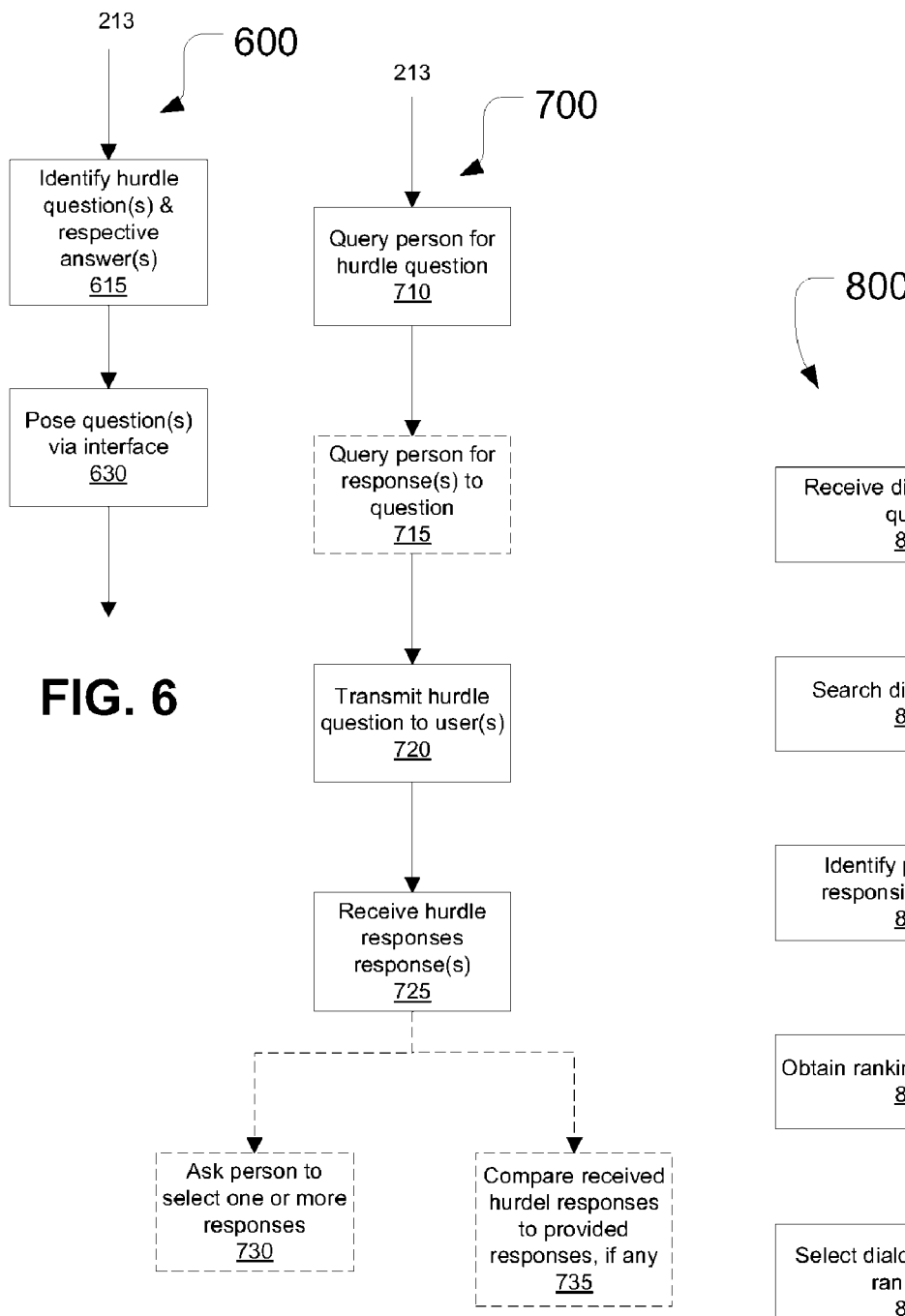
FIG. 6
FIG. 7
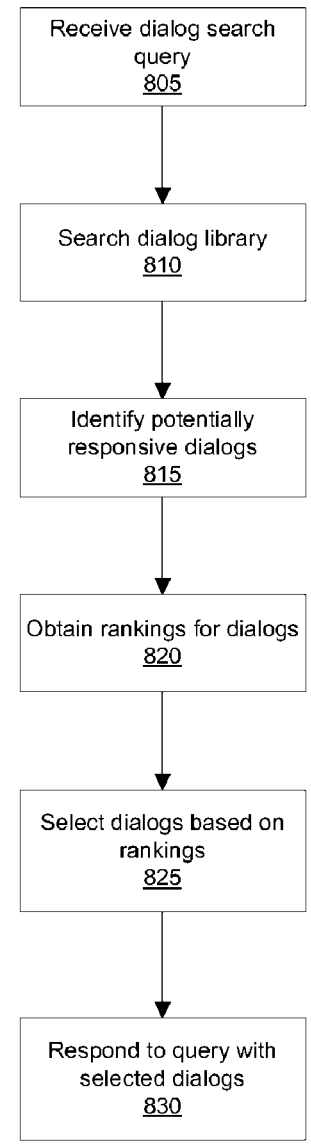
FIG. 8

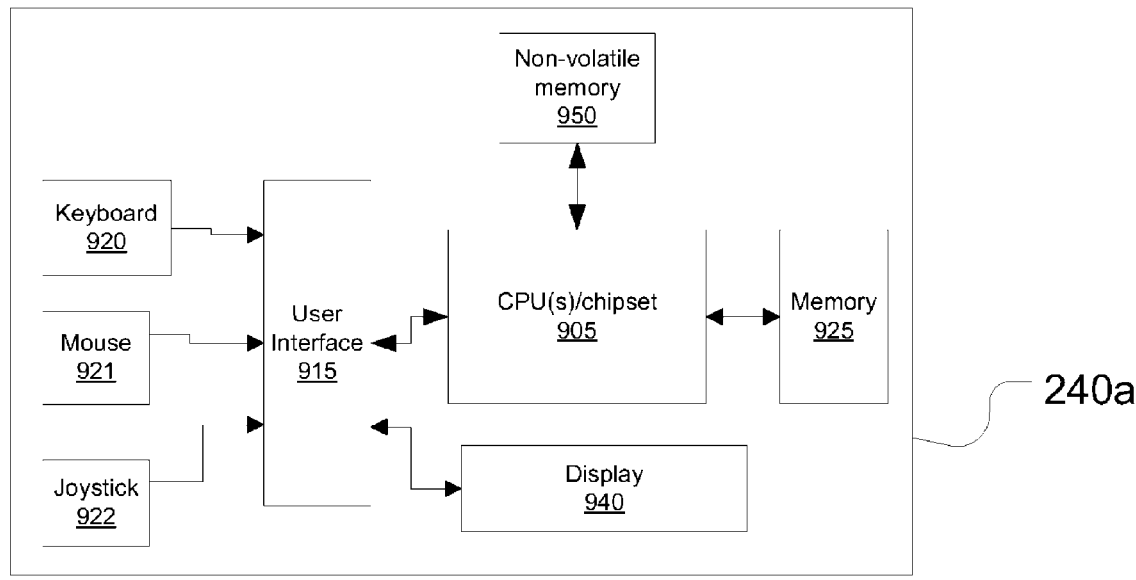
FIG. 9
FIG. 10
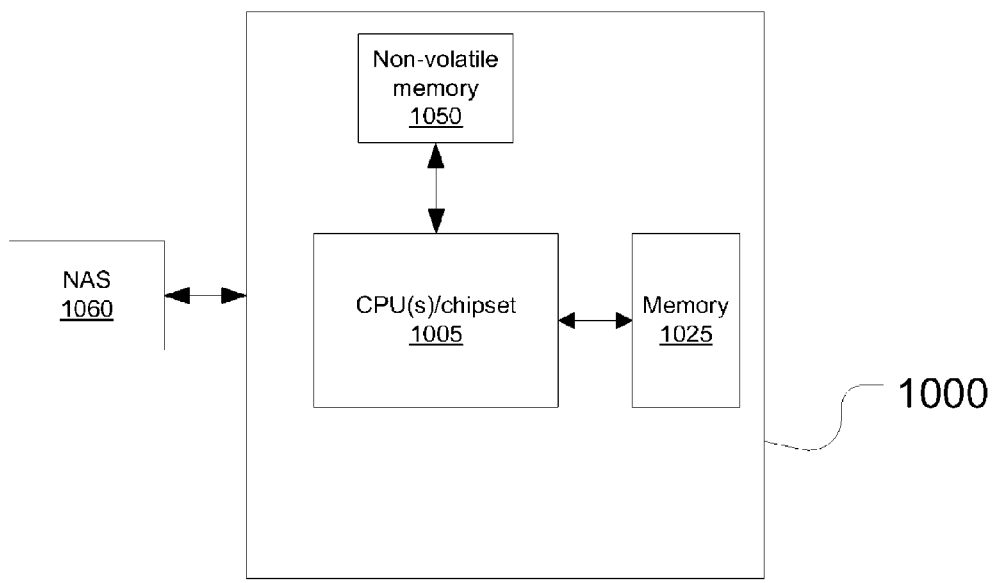

REAL TIME EXPERT DIALOG SERVICE

BACKGROUND

1. Field

The present invention generally relates to online forums, and more specifically to forums where users can obtain information relating to questions that they pose from others who respond, if they desire to.

2. Description of Related Art

Currently Yahoo! provides forums where a first user can post a question that can be read by an audience, and members of the audience can respond to answer the question. The audience can rank the responses, and users with highly-ranked responses accumulate points evidencing their participation in the forums. Improvements and extensions to systems of this sort are desirable.

SUMMARY

Aspects include a method of initiating an interactive dialogue in an online community, which comprises receiving a topic suggestion from a first person, and categorizing the topic suggestion into a subject matter category. The method also includes posing a test related to the subject matter category to a subset of users of the online community who potentially have expertise in the subject matter category, receiving responses to the test, and determining from which users an acceptable response was received. Then, the person who provided the topic suggestions is connected in the method to one or more users who submitted an acceptable response, in order to facilitate a dialog. Thereafter, the method also comprises providing a capability for the first person and the one or more users to determine collectively whether to publish electronically a transcript of the dialog. In some aspects, dialog participants can individually decide whether to approve publication of the dialog.

Such aspects also can include ranking users of the online community for expertise in the subject matter category, and dialogs can be established between dialog topic proposers and highly ranked users. Ranking can be based on other content generated by users, including other previously committed dialogs that have been rated by others. Other aspects can include a facility for searching previously published dialogs and allowing rating of them, as well as other commentary.

The subject matter test can be selected either by a system facilitating the online community, or by the person proposing the dialogic topic, and either the person or the system determines characteristics of an acceptable result.

Still other aspects can include providing a capability for one or more users receiving a proposed dialog topic to pose a subject matter expertise test to the person proposing the dialog topic, prior to connecting.

Still further aspects can include categorizing users into subject matter categories, reflecting one or more of expertise and interests of such users. Then, methods can include determining possible users to a given dialog topic based on such user categorization. Such possible users can be further narrowed by determination of present availability or willingness to receive topics, as well user rankings, and/or a subject matter test.

Any such methods can be embodied in instructions stored on computer readable media that can be used to configure one or more computers to implement the methods. After storage of such instructions on that computer readable media, that computer readable media is an article of manufacture. Such methods can be implemented as a service among a number of services provided through a web site or another information delivery means that can allow exchange of necessary information, such as dialog topics. For example, a service such as Skype or another suitable Voice over IP service, coupled with Text to Speech functionality may be used for interfacing users together to form dialogs.

For example, such a system for providing an online dialog service can comprise an interface element operable for receiving a topic suggestion electronically from a first person, a categorizer operable for determining a category for the topic from a plurality of categories available to the categorizer, and a selector operable for selecting users of the online community having expertise in the category. The system can also comprise a tester operable for posing an initial subject matter test in the category to at least some of the selected users and determining from which selected users an acceptable response was received, and a dialog initiator operable for connecting the first person and one or more of the selected users who provided acceptable responses. The system also can comprise a dialog recorder for recording the dialog, and an interface element operable for allowing conclusion of the dialog and posting of the dialog for online availability.

Further articles of manufacture can be created according to method aspects disclosed herein, and can comprise articles of manufacture storing dialogs created according to these methods.

BRIEF DESCRIPTION OF THE DRAWINGS

For a fuller understanding of aspects and examples disclosed herein, reference is made to the accompanying drawings in the following description.

FIG. 6 It illustrates a method for verifying user subject matter expertise;

FIG. 7 illustrates another method for verifying user subject matter expertise;

FIG. 8 illustrates a method for providing search capability and display of dialogs that may be responsive to a particular search;

FIG. 9 illustrates example components of a computer that can be used for interfacing a person with a service according to the description; and FIG. 10 illustrates example components of a server computer that can be used in providing services according to the description.

DETAILED DESCRIPTION

The following description is presented to enable a person of ordinary skill in the art to make and use various aspects of the inventions. Descriptions of specific techniques, implementations and applications are provided only as examples.

Various modifications to the examples described herein may be apparent to those skilled in the art, and the general principles defined herein may be applied to other examples and applications.

The following relates to examples and aspects of providing a capability of initiating category specific real-time dialogs between a person posting a dialogue topic and one or more of a plurality of known experts in that topic area. These aspects and examples may further involve tracking or otherwise recording the dialogue taking place and upon completion of the dialogue allowing the participants in the dialogue to decide whether the dialogue should be available to the public at large for searching, rating, and other commentary. A still further aspect can include that users participating in dialogs may receive ratings from other users based on dialogs published in a particular category, and thus can achieve higher stature, gaining preference and ranking for engaging in further dialogs in that category. Also, because carrying on a successful real-time dialog about a particular subject is made easier when the dialog participants are familiar with the subject, connecting a person to a user knowledgeable in the subject is helpful, and an initial subject matter test can be used in identifying a participant for a particular dialog.

In this description, it is generally provided that a person, who may or may not be a regular user of the site or service providing such real-time dialogue capability, may propose a dialogue topic to the site or service, which can function to identify potential users known to the site or service, who are willing to engage in real time dialogs and who have subject matter expertise in one or more categories related to the topic posed by the person. Thus, the following description, for ease of reference, uses the term "person" to refer to a person posing a dialogue topic, while the term "user" refers to a person who is known to the site or service and can be selected or offered an opportunity to engage in a dialogue with the person.

Figure 1:
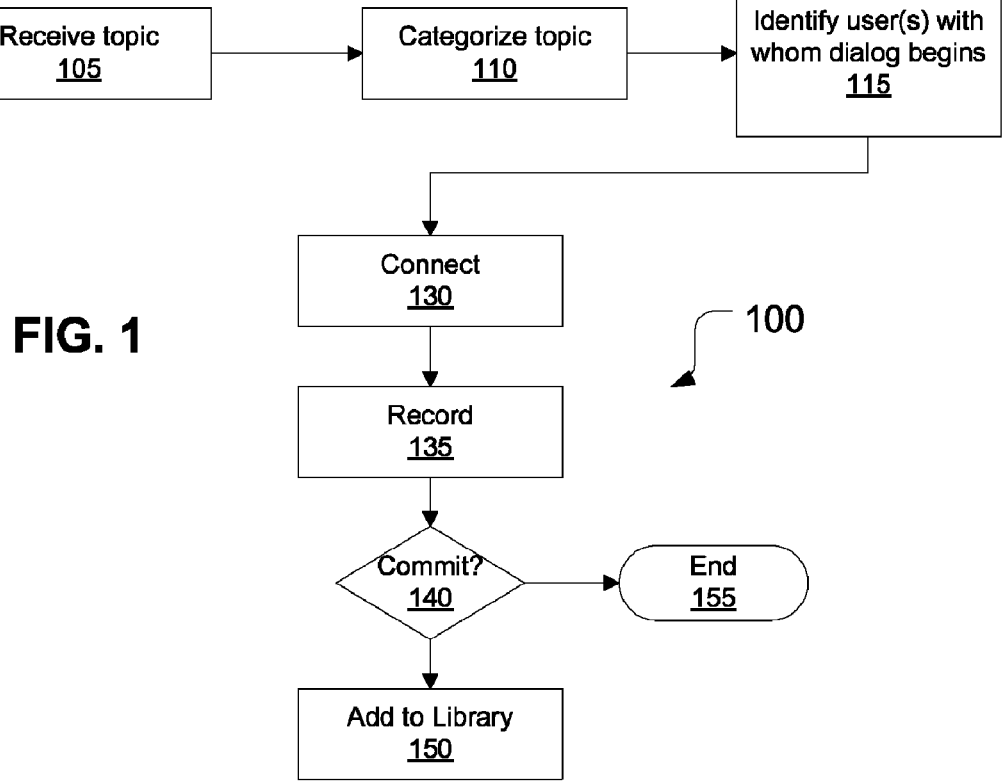
FIG. 1 illustrates a steps of a method for providing real time dialogue initiation functionality.

To start with, FIG. 1 illustrates aspects of a method 100, which may be employed to accomplish real-time dialogue initiation according to aspects described herein. Method 100 provides an overview to introduce these aspects and further specificity and detail concerning these aspects is described in further detail herein. Method 100 begins with receiving (105) a suggested topic for a dialogue, such as receiving the topic through a text entry field of a web browser interface.

At step 110, the topic is categorized. Its categorization can be implicit from a context in which the topic was received, for example, or can be determined by textual analysis. For example, a person submitting a topic for reception may currently be browsing in a portion of a website relating to a particular category. Alternatively, or additionally, a category can be determined from the content of the suggested topic. For example, a search algorithm can be used to identify one or more known categories that relate to certain words contained in the suggested topic. For example, if the suggested topic included the word, "Plato", then the categorization logic may categorize the suggested topic into a philosophy category. By example of a further alternative, the person submitting the suggested topic may be presented with a menu from which one or more categories can be selected.

The method 100 continues with identifying 115 one or more users known to the service having expertise in the category of the suggested topic. Various methods, aspects, and examples for identifying such users will be described with respect to further figures herein.

Method 100 continues with connecting 130 the identified the user or users to the person who originally submitted the suggested dialogue topic. Method 100 continues with recording the dialogue as it progresses. For example, a server may record (135) the text that each user types as the dialogue progresses. Since in these examples the dialogue is occurring in real time, the dialogue would be expected to comprise text offered by both parties potentially in an alternating fashion. The dialogue may continue for some time. When the person and the user or users engaged in the dialogue determine to end it, each of the person and the user or users is provided an opportunity to decide whether or not the dialogue should be committed 140 for publication.

It is preferred herein that each of the person and the user or users can independently determine whether or not the dialogue should be committed for publication. If any of them decide that the dialogue should not be published, then the dialogue would not be made available for public viewing. Thus, each participant both has an incentive to produce a quality dialog while also being able to prevent publication of a dialog that the participant feels does not adequately reflect that participants expertise, or is otherwise objectionable. If the dialogue is determined to be committed for publication, then method 100 includes adding 150 the dialogue to a library of dialogs available online.

Thus at a high level, it can be discerned that two or more people can engage in a real-time dialogue facilitated by a service. The way in which users are determined to participate in the dialogue is a topic of further explanation herein. The contents of that dialogue can be recorded, and the two or more people participating in that dialog can determine whether or not they would wish that dialogue to be published.

Figure 2:
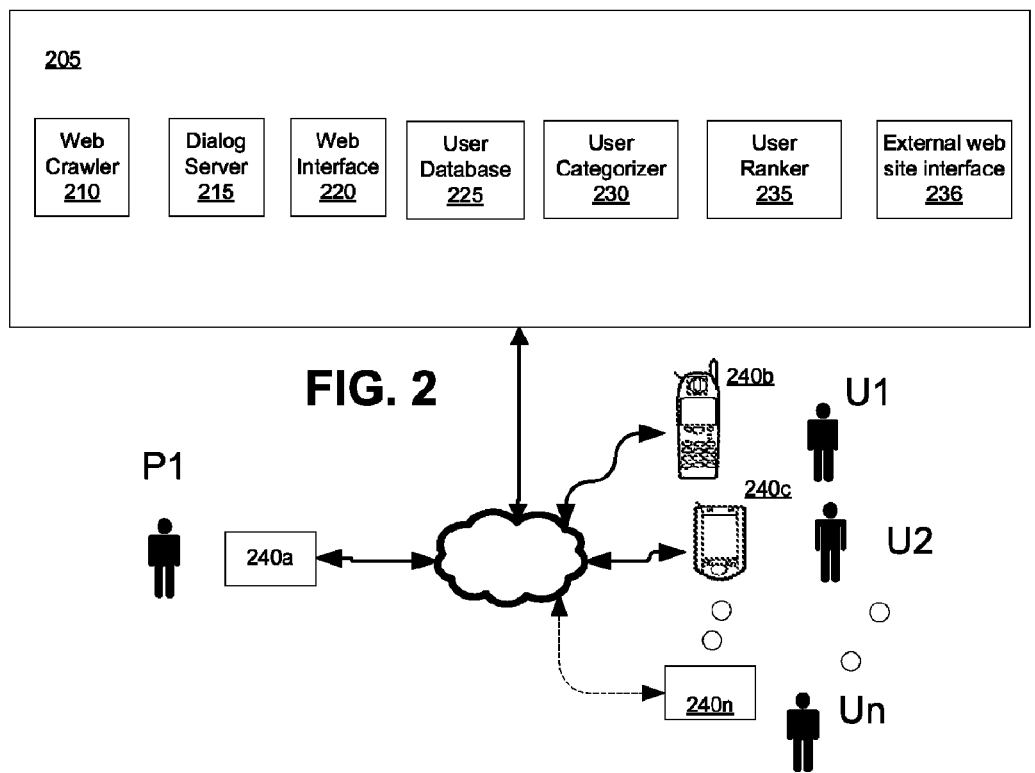
FIG. 2 illustrates an arrangement comprising a service for providing real-time dialogue functionality to users of the service and others.

In this context, FIG. 2 illustrates an arrangement where a service 205 can facilitate the method 100 of FIG. 1 between a person (PI) communicating from computer 240a and users, respectively identified as U1 through Un. Each of the users communicates using devices respectively identified as cell phone 240b, a smart phone 240c, and a computer 240n. The devices illustrated to facilitate such communication in the arrangement of FIG. 2 are exemplary and other devices can be used in the furtherance of examples and methods presented herein. For example, it is generally contemplated in one example that a dialogue will primarily be text-based; however, speech recognition also could be used to convert speech to text during a dialogue.

The service 205 can be implemented using a variety of processes, examples of which are illustrated in FIG. 2. For reasons that will be made clearer herein, service 205 can include a Web crawler process 210, a dialogue server 215, a Web interface process 220, a database containing user information 225, a user categorization process 230, a user ranker process 235, and an external website interface process 236.

Figures 3A, 3B, 3C:
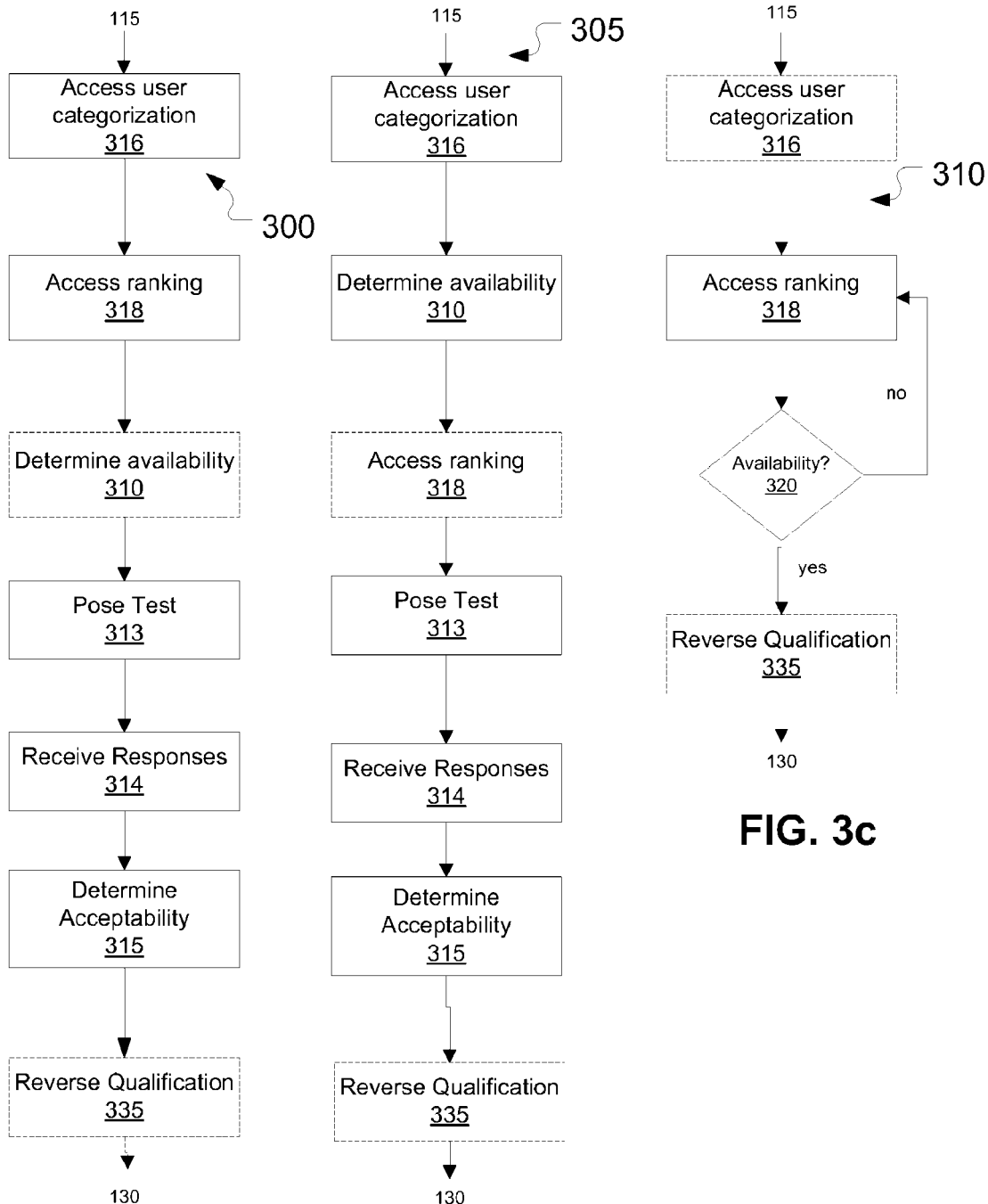
FIGS. 3a-3c illustrate the method is for identifying its users of the service, who may be appropriate candidates for a given real-time dialogue topic.

Continuing with FIG. 3a, a first example of further steps to identify users that may participate in a dialogue is provided. Upon categorization of a topic, method 300 includes accessing 316 a user categorization, for example, user database 225 can include information concerning in what categories users of service 205 have expertise. For example, some users may have expertise relating to philosophy while other users may have expertise to history, the arts, popular music, technology or any other conceivable topic or some topic. Such categorization can be broad and/or more specific, in that if many users identify with a given category, then that category may be subdivided into finer categories, and depending on the degree to which the suggested dialogue topic can be categorized, an output from step 316 can include identification of users in a broader or a narrower category. Although expertise is a primary concern, interest in a given category also is of concern, and can factor into categorization of users.

Once users in a category relevant to the dialogue topic are identified, those users can be ranked 318 amongst themselves as to their expertise in that category. User ranking can be based on a large variety and number of criteria, including aspects such as whether previous dialogs in the same category were ranked highly by other users of the system, that a user has a job in a related field, or even information available on the Internet in general can be searched and used to determine a user's expertise in that category. Further aspects of ranking will be addressed herein.

Method 300 may proceed with determining 310 availability of one or more users determined to rank highly. For example, not all users will be online at the same time, or users may also provide an indication that they are not presently willing to receive suggested dialogue topics. Alternatively, a determination of availability can proceed by sending a suggested dialogue topic to those users determined to rank highly and then a message containing that suggested dialogue topic would simply not reach unavailable users. In either case, an initial selection of highly ranked users can be further narrowed by a determination or by a practical implementation of an availability determination.

Method 300 thereafter proceeds with available highly ranked users by posing 313 a subject matter test to such users. Such a test provides an initial hurdle to verify subject matter expertise on the part of a user and can be implemented in a variety of ways, examples of which are disclosed herein. Categorization of users can be used to establish an interest level and provide an initial estimate of expertise. The hurdle test can verify such expertise. Users provide responses to the test, which are received 314 by service 205. The acceptability of these responses is determined at step 315. Such determination of acceptability can be performed by the person who proposed the suggested dialogue topic or alternatively can be automated by the system, as described in further detail herein. Once one or more acceptable responses have been received, a user or users can be selected to participate in the dialogue with the person.

A further step that can be conducted is a reverse qualification test 325 that can be performed on behalf of the user or users selected, and which can test a subject matter expertise level of the person suggesting that dialogue topic. For example, some users may desire to participate in dialogs only with persons who have a certain background in the category, such as experts, while other users may be willing to engage in dialogs with anyone. Once one or more available users have been identified and vetted by the method 300, the method of 100 can continue at the connection step 130.

Now turning to FIG. 3b, a variation method 305 of method 300 is presented. Method 305 can begin from step 110 of FIG. 1, and also includes the step of accessing 316 user categorization information, as well as a step of determining availability 310 of users in that category or categories determined relevance for the dialogue topic proposed.

The method 305 differs from method 300, in that ranking information is not accessed, and instead available users are directly posed a test of subject matter competence. Responses are received 314 from the available users who were given the test and acceptability of answers received are determined 315. The step of reverse qualification 335 also can be conducted in method 305. Method 305 thus illustrates an example, where ranking information may not be maintained or where it is, for example, it may be determined that a category for the proposed dialogue topic has a small enough number of users that a ranking of such users is unnecessary.

However, it is generally contemplated that ranking information should be used to select users of service 205, who are to receive an opportunity to engage in the dialogue. This is at least because such ranking would be considered a reward for participation.

Now turning to FIG. 3c, a further method 310 is illustrated. Here, user categorization information may be accessed 316. However such access is not mandatory. Method 310 continues with accessing ranking information 318 for users of service 205. Generally, this ranking information would be category specific, but any example herein allows for ranking information to be used more broadly and among a plurality of categories or even at a level of the entire service 205 itself. In this example, more highly ranked users would be first selected for an availability determination 320, and if such user or users were unavailable, then, a next user or users in rank order may be selected and the availability determination 320 repeated. Once a user or users is determined to be available, i.e. available to receive proposed dialogue topics, reverse qualification step 335 may be provided, and thereafter method 100 may continue with connection step 130.

The method is illustrated in FIGS. 3a, 3b, and 3c illustrate examples of how a user or users may be identified as users who are willing and able to engage in a real-time dialogue with the person about a given topic. In a service with a large number of users ranking users by category, additionally posing a subject matter test as a prerequisite for engaging any given real-time dialogue is a preferred method, as illustrated in FIG. 3a. These steps need not be performed sequentially, in that for example, highly ranked users can be categorized or categorized users can be ranked, etc.

The reverse qualification step 335 may be implemented in a number of ways including for example, allowing users of service 205 to specify a desire to receive one or more of the beginner, intermediate, and advanced conversation topics. Persons proposing dialogue topics may then be asked to self identify a level of dialogue sought and this then may provide an additional layer of screening to properly match a person posing a dialogue topic to a user with whom that person may have a satisfying dialogue.

Figure 4:
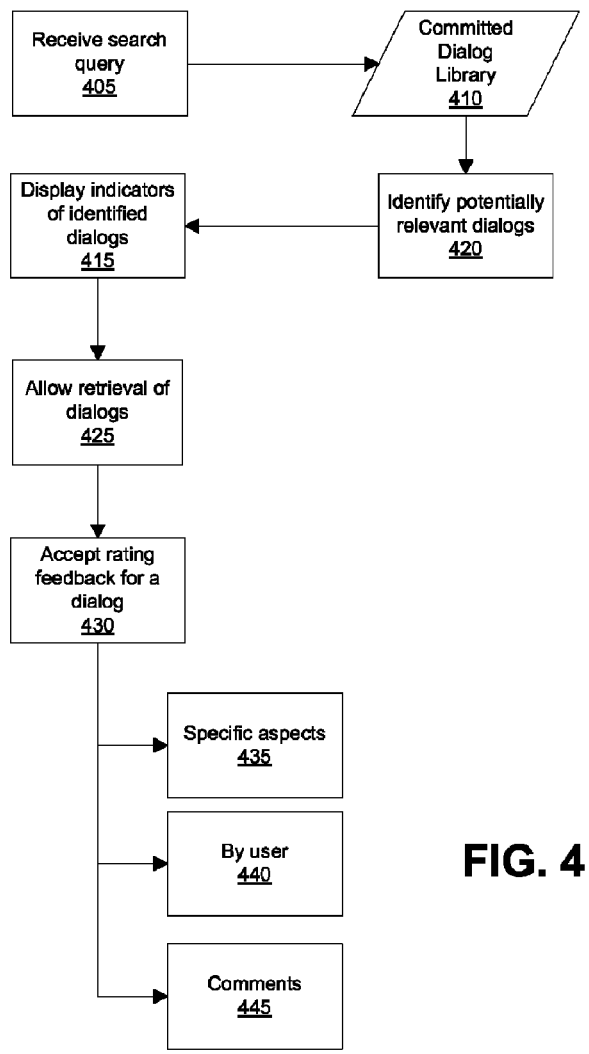
FIG. 4 illustrates aspects of a method for allowing franking and reading information to be recorded for published dialogs.

Now turning to FIG. 4, additional aspects of how dialogs may be rated and how such dialogue ratings may influence user rankings is described. As described with respect to method 100, the person and the user or users who have engaged in a given dialogue may commit that dialogue to be published. Method 400 may begin with a step of receiving a search query 405. Such a search query may be submitted by a searcher desiring to identify a committed dialogue available through the service 205 relevant for terms specified in the submitted search query. Service 205 can access 410 a library of committed dialogs to identify 420 one or more relevant dialogs, and display 415 indicators of those identified dialogs to the searcher. For example, such indicators may include abstracts of the dialogue, which may include the original proposed dialogue topic, user names that participated in the dialogue, as well as a ranking of the dialogue based on ranking information received up to that point. The service 205 may allow 425 the searcher to select one or more of the dialogs indicated. The searcher may then provide feedback on the dialogs reviewed, which is accepted 430 by service 205.

In some particular examples, service 205 may query the searcher for feedback in one or more areas, for example. The service 205 may query the searcher for her opinion about specific aspects 435 of the dialogue.

Such specific aspects may include accuracy, professionalism or formalism, uniqueness of contribution, and whether the searcher found the dialogue to be informative. Other rating aspects that the service 205 may ask of the searcher is a feedback rating for each person and user who participated in the dialogue. Although it is generally preferred to consider real time dialogs as contemplated herein to be a joint contribution of all those who participated in the dialogue, it may be the case that one or more of the participants in a given dialogue should be given more or less credit for it. Also service 205 may solicit general comments 425 from the searcher to further characterize the content of that dialogue. Such comments may be made available to others who search for dialogs available through service 205.

Figure 5:
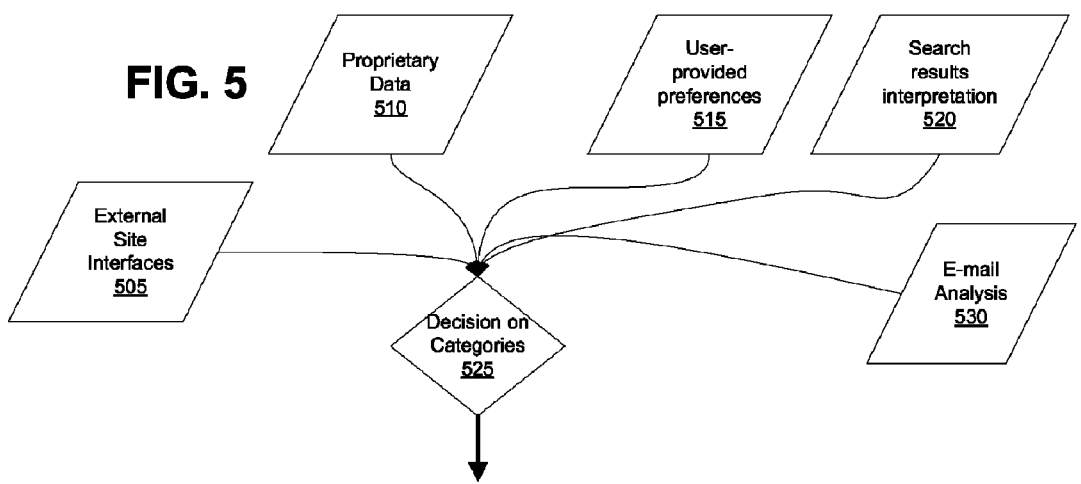
FIG. 5 illustrates sources of information that can be used to rank users of the service in determining whether to provide a given user an opportunity to participate in a given online dialogue.

The ranking information compiled in method 400 can be used as one component of the overall ranking of the user in a particular category, as well as more broadly in the service 205 as a whole. FIG. 5 illustrates components of information that may be used in developing a ranking of a user in one or more categories available on the system. For example, service 205 may be one service of a number of services available through a particular service provider. Thus, the service provider may have other information on a user that can be helpful for determining categories in which that user has expertise. Such information available from the service provider is presented by proprietary data 510. For example Yahoo!, Inc. provides a forum for group discussions, organized by topic. Information about users' contributions in such groups or forums may factor into their respective rankings for the purpose of establishment of real time dialogs in a given subject matter area. By further example, Yahoo!, Inc. provides job search functionality as well as job posting functionality; information about a user's job postings or other professional activity information available through such functionality also can be used.

Of course, user provided preferences 515 also can be considered, and that a person may desire to become more involved in a given category and is learning in that category but may not yet be considered a subject matter expert. Searching of publicly available information such as information available on the Internet also can be used to identify subject matter expertise of users of service 205.

Additionally, external sites can provide information useful in determining rankings via prearranged interfaces, via XML or pre-set data formats, and the like. For example, professional networking sites such as LinkedIn can provide employment information, degree information and the like about users of LinkedIn, who also are users of service 205. Other social networking sites such FaceBook and MySpace also can be sources of information useful in ranking users of service 205. These differing sources of information can be blended together in any of a variety of ways to arrive at a ranking for a user in a particular category. And, in cases where a category has one or more subcategories, and where particular information is available, users may be given different rankings for those subcategories. For example, a user may be given a first ranking in art history and a different ranking in a particular style of art.

As disclosed above, ranking information for users can be a useful component in a process for identifying one or more users with expertise in a given real-time dialogue topic. Another technique that can be used additionally is the technique of posing a subject matter test to one or more users who may have expertise in a given category, and therefore would be candidates for participation in a given dialogue. FIG. 6 illustrates one alternative method 600 for posing such a subject matter test to one or more users. In the exemplary method 600, service 205, based on categorization of a proposed dialogue topic, can identify a subject matter question from a database of subject matter questions, and an answer to that question. In one example, the question can be posed to the one or more candidate users via the Web interface in a multiple-choice format, wherein a correct answer is interpose among incorrect answers. This multiple-choice method has the benefit of simplicity in that the subject matter test can be automated and answers are not ambiguous.

A further example approach to a subject matter test is presented with respect to FIG. 7. FIG. 7 illustrates steps of method 700 wherein the person proposing a dialogue topic is queried 710 by service 205 for a subject matter question relevant to the proposed dialogue topic (710), and optionally an answer (715) to the question. Service 205 then transmits 720 the question provided by the person to one or more candidate users. Service 205 receives 725 responses from at least some of the users presented with the question. Now, depending upon the nature of the response, service 205 can ask 730 the person proposing that dialogue topic, whether each response received is correct or incorrect, or even whether the person prefers one response to another. Alternatively service 205 can automatically compare responses received by users with a response provided by the person proposing that dialogue topic. Then, a user's selection or determination of correctness of one or more responses can be used in determining which user or users should be connected to the person proposing a dialogue topic.

Since one intended result of service 205 facilitation of real time dialogue initiation is a compiled library of committed and categorized dialogs, FIG. 8 illustrates steps of method 800, which may be used to access such compiled dialogs. In step 805 service 205 can receive a dialogue search query, and using that search query, can search 810 a dialogue library. Service 205 identifies 815 potentially responsive dialogs, obtains 820 rankings for those dialogs, and selects highly ranked dialogs for presentation 830 to the searcher. When such dialogues are compiled into a library, the library can be stored on a computer readable medium, such that the computer readable medium becomes an article of manufacture created according to the dialog-related methods herein.

FIG. 9 illustrates components of a computer system that can be used to implement computer system 240a. Such a computer system can include a keyboard 920, mouse 921, joystick 922 as examples of user input devices that provide input to user interface 915. User interface 915 communicates with CPUs/chipset 905 which provide processing functionality and can receive data from nonvolatile memory 950 which can include a solid-state or a magnetic disk drive for example. User interface 915 also can communicate with a display 940. Working memory 925, such as DRAM, also can be used by CPU 905 to store information currently being used. FIG. 10 illustrates a computer 1000 that may be used alone or in combination with other computers for hosting processes implementing service 205. Computer 1000 also may comprise one or more CPUs and a chipset collectively labeled 1005, which may communicate with a main memory 1025, as well as with a nonvolatile memory 1050 other memory or storage available to computer 1001 includes Network Attached Storage (NAS) 1060. Any or all of the processes illustrated in FIG. 2 for service 205 can be implemented in one or more computers 1000, or as threads in such computers.

Various pre-existing communications facilities and other functionality, like web functionality, can be used to implement methods according to these examples. For example, a service such as Skype or another suitable Voice over IP service, coupled with Text to Speech functionality may be used for interfacing users together to form dialogs.

Code for these processes can be stored in computer readable media, such as solid-state drives, hard drives, CD-ROMs and other optical storage means, transiently in nonvolatile memories as well as embodied in communication signals.

Dialogs also can be saved or otherwise recorded to any of a variety of computer readable media or otherwise stored in a database for searching and subsequent retrieval The Web interface process 220 of FIG. 2 can be used for interfacing with the person proposing a dialogue topic as well as any user of the service 205 that may be a potential participant in such a dialogue. For example, web interface process 220 may serve web pages comprising appropriate interface information as well as other information, such as advertisements. The processes illustrated in FIG. 2 may also be implemented as any number of sub processes modules or functions as deemed appropriate for a particular implementation. The devices illustrated in FIG. 2 being used by the person and the users are exemplary and other communication devices can be used in systems and methods according to these disclosures.

Programming for implementing methods according to above-described examples can be distributed among one or more computers connected in a network, which collectively provide service 205 and potentially other services to remote users. When information is transferred or provided over a network or another communications connection (either hardwired, wireless, or a combination of hardwired or wireless) to a computer, the computer uses that connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

Computer-executable instructions comprise, for example, instructions and data which cause or otherwise configure a general purpose computer, special purpose computer, or special purpose processing device to perform a certain function or group of functions. The computer executable instructions may be, for example, binaries, intermediate format instructions such as assembly language, or source code.

The examples presented herein provide illustrations of ways in which real time category specific dialogs can be facilitated by an online service. The various examples presented combinations of user categorization, user of ranking, subject matter testing, and user availability determinations to arrive at a selection of one or more users to provide an opportunity to engage in a dialogue on the proposed topic. Different implementations may implement different combinations of these aspects or combinations of subsets of these aspects. In a large-scale system, with many categories and many users, it is contemplated that a categorization or ranking of users, followed by a subject matter test allows both assurances of subject matter expertise and adequate rewards for participation in creation of committed dialogs. Further by providing each participant in a dialogue with an option to allow or prevent publication of such dialogue, it is contemplated that each participant then would have an interest in the overall quality of the dialogue. Many variations and enhancements to the examples and aspects disclosed herein will be apparent to those of ordinary skill in the art in view of these disclosures, and all such variations and enhancements should therefore be considered within the scope of the appended claims and their equivalents.

I claim:

1. A method of initiating an interactive dialog in an online community, comprising:
    establishing a categorization of users of the online community into a plurality of subject matter categories;
    receiving a topic suggestion from a first person;
    categorizing the topic suggestion into a subject matter category of the plurality of subject matter categories;
    identifying, based on the categorization, a subset of users that have been categorized into the subject matter categories;
    wherein the subset includes one or more first users of the online community but not one or more second users of the online community;
    posing a test related to the subject matter category to the subset of users but not to the one or more second users;
    receiving responses to the test;
    identifying one or more third users, of the one or more first users, from whom an acceptable response was received;
    connecting the first person and the one or more third users from whom an acceptable response was received to facilitate a dialog, between the first person and the one or more third users; and
    facilitating the dialog between the first person and the one or more third users;
    providing each of the first person and the one or more third users a mechanism by which to indicate approval to publish the dialog; and
    publishing the dialog electronically to the online community only upon determining that each of the first person and the one or more third users decided the dialog should be committed for electronic publication;
    wherein the method is performed by one or more computing devices.

2. The method of claim 1, further comprising ranking users of the online community for expertise in the subject matter category, and wherein connecting further comprises preferring to connect the first person to one or more highly ranked users, from whom acceptable responses were received.

3. The method of claim 2, wherein the ranking is based on other content generated by each ranked user.

4. The method of claim 2, wherein the ranking is based community feedback about other content generated by each ranked user.

5. The method of claim 1, wherein the test is selected either by the first person or a system facilitating the online community, and either the first person or the system determines characteristics of an acceptable result.

6. The method of claim 1, further comprising providing a facility for users of the online community for rating the documented dialog, using the rating of the documented dialog for ranking users of the online community within the subject area to which the documented dialog relates, and giving preference to higher ranked users for establishment of future online dialogs.

7. The method of claim 1, further comprising providing a capability for the one or more third users to pose a subject matter expertise test to the first person prior to connecting.

8. The method of claim 1, wherein publishing the dialog includes electronically publishing a transcript of the dialog upon conclusion of the dialog between the first person and the one or more third users.

9. A method for establishing a dialog in an online community, comprising:
    receiving a dialog topic from a person;
    determining a subject matter category for the dialog topic;
    accessing category information for users of a plurality of users, the category information including categorizations of users into subject matter categories based on respective information about user participation in a plurality of online activities;
    based on user categorization, determining possible users to receive the dialog topic;

accessing a relative ranking of the possible users, the relative ranking based on indicia of community approval of the other content in the category generated by the possible users;

based on the rankings of possible users, determining one or more second users from the possible users to receive the dialog topic;

sending the dialog topic only to the one or more second users;

facilitating the dialog between the person and the one or more second users;

providing each of the person and the one or more second users a mechanism by which to indicate approval to publish the dialog; and wherein the method is performed by one or more computing devices.

10. The method of claim 9, wherein the plurality of online activities are available through a provider of the online community, and further comprising collecting the information and associating the collected information with the respective users.

11. The method of claim 9, further comprising verifying whether possible users have indicated present willingness to receive dialog topics, and determining to exclude from receiving the dialog topic any possible user not having indicated such present willingness.

12. The method of claim 9, further comprising querying the possible users to verify knowledge of the subject matter category of the dialog topic, wherein querying the possible users includes posing a hurdle to the possible users.

13. The method of claim 9, wherein the dialog is added to a library of dialogs categorized into one or more categories, and wherein a dialog may be associated with a plurality of categories, and further comprising providing a web interface for reviewing and searching the library of dialogs.

14. A computer-implemented system for providing an online community, comprising:

an interface element operable for receiving a topic suggestion electronically from a first person;

a categorizer operable for determining a category for the topic from a plurality of categories available to the categorizer;

a selector operable for selecting users of the online community having expertise in the category, based, at least in part, on categorization of users to categories;

a tester operable for posing an initial subject matter test in the category to at least some of the selected users and determining from which selected users an acceptable response was received;

a dialog initiator operable for connecting the first person and one or more of the selected users who provided acceptable responses, to facilitate a dialog, between the first person and one or more of the selected users;

a dialog recorder for recording the dialog;

an interface element operable for facilitating the dialog and providing each of the first person and the one or more selected users a mechanism by which to indicate approval to publish the dialog; and a publisher operable for publishing the dialog electronically to the online community only upon determining that each of the first person and the one or more selected users decided the dialog should be committed for electronic publication.

15. The system of claim 14, further comprising an interface element available to the users of the online community operable for receiving an indication from the users as to willingness to engage in online dialogs.

16. The method of claim 1, further comprising:

storing data that indicates which users of the online community are associated with each subject matter category of a plurality of subject matter categories supported by the online community;

wherein the step of posing a test is performed by posing the test to only those members of the online community that are associated with a particular subject matter category into which the topic suggestion was categorized.

17. The method of claim 16, wherein posing the test comprises posing the test to only those members, associated with the particular subject matter category, that have rankings above a predetermined threshold.

18. A non-transitory computer-readable medium storing one or more sequences of instructions for initiating an interactive dialog in an online community, wherein processing of the one or more sequences of instructions by one or more processors causes:

establishing a categorization of users of the online community into a plurality of subject matter categories;

receiving a dialog topic from a person;

categorizing the topic suggestion into a subject matter category of the plurality of subject matter categories;

identifying, based on the categorization, a subset of users that have been categorized into the subject matter categories;

wherein the subset includes one or more first users of the online community but not the one or more second users of the online community;

posing a test related to the subject matter category to the subset of users but not to the one or more second users;

identifying one or more third users, of the one or more first users, from whom an acceptable response was received;

connecting the first person and the one or more third users from whom an acceptable response was received to facilitate a dialog, between the first person and the one or more third users; and facilitating the dialog between the person and the one or more third users;

providing each of the person and the one or more third users a mechanism by which to indicate approval to publish the dialog; and publishing the dialog electronically to the online community only upon determining that each of the first person and the one or more third users decided the dialog should be committed for electronic publication.

19. The non-transitory computer-readable medium of claim 18, further comprising instructions for ranking users of the online community for expertise in the subject matter category, and wherein connecting further comprises preferring to connect the first person to one or more highly ranked users, from whom acceptable responses were received.

20. The non-transitory computer-readable medium of claim 18, wherein the ranking is based on other content generated by each ranked user.

21. The non-transitory computer-readable medium of claim 18, wherein the ranking is based community feedback about other content generated by each ranked user.

22. The non-transitory computer-readable medium of claim 18, wherein the test is selected either by the first person or a system facilitating the online community, and either the first person or the system determines characteristics of an acceptable result.

23. The non-transitory computer-readable medium of claim 18, further comprising instructions for querying each of the first person and the identified user for approval to publish the dialog.

24. The non-transitory computer-readable medium of claim 18, further comprising instructions for providing a facility for users of the online community for rating the documented dialog, using the rating of the documented dialog for ranking users of the online community within the subject area to which the documented dialog relates, and giving preference to higher ranked users for establishment of future online dialogs.

25. The non-transitory computer-readable medium of claim 18, further comprising instructions for providing a capability for the one or more users to pose a subject matter expertise test to the first person prior to connecting.

26. A non-transitory computer-readable medium storing one or more sequences of instructions for initiating an interactive dialog in an online community, wherein processing of the one or more sequences of instructions by one or more processors causes:
  receiving a dialog topic from a person;
  determining a subject matter category for the dialog topic;
  accessing category information for users of a plurality of users, the category information including categorizations of users into subject matter categories based on respective information about user participation in a plurality of online activities;
  based on user categorization, determining possible users to receive the dialog topic;
  accessing a relative ranking of the possible users, the relative ranking based on indicia of community approval of the other content in the category generated by the possible users;
  based on the rankings of possible users, determining one or more second users from the possible users to receive the dialog topic;
  sending the dialog topic only to the one or more second users;
  facilitating the dialog between the person and the one or more second users;
  providing each of the person and the one or more second users a mechanism by which to indicate approval to publish the dialog.

27. The non-transitory computer-readable medium of claim 26, wherein the plurality of online activities are available through a provider of the online community, and further comprising instructions for collecting the information and associating the collected information with the respective users.

28. The non-transitory computer-readable medium of claim 26, further comprising instructions for verifying whether possible users have indicated present willingness to receive dialog topics, and determining to exclude from receiving the dialog topic any possible user not having indicated such present willingness.

29. The non-transitory computer-readable medium of claim 26, further comprising instructions for querying the possible users with a hurdle to verify knowledge of the subject matter category of the dialog topic, wherein querying the possible users includes posing a hurdle to the possible users.

30. The non-transitory computer-readable medium of claim 26, wherein the dialog is added to a library of dialogs categorized into one or more categories, and wherein a dialog may be associated with a plurality of categories, and further comprising instructions for providing a web interface for reviewing and searching the library of dialogs.

* * * * *

UNITED STATES PATENT AND TRADEMARK OFFICE
CERTIFICATE OF CORRECTION

| | |
|---|---|
| PATENT NO. | : 7,974,940 B2 |
| APPLICATION NO. | : 12/125691 |
| DATED | : July 5, 2011 |
| INVENTOR(S) | : Kalyan Ayloo |

It is certified that error appears in the above-identified patent and that said Letters Patent is hereby corrected as shown below:

COLUMN 14

Claim 29: Line 22: After "possible users" and before "to verify" delete "with a hurdle".

Signed and Sealed this
Sixteenth Day of August, 2011

David J. Kappos
*Director of the United States Patent and Trademark Office*